United States Patent [19]

Dariel et al.

[11] Patent Number: 5,261,001
[45] Date of Patent: Nov. 9, 1993

[54] MICROCIRCUIT FOR THE IMPLEMENTATION OF RSA ALGORITHM AND ORDINARY AND MODULAR ARITHMETIC, IN PARTICULAR EXPONENTIATION, WITH LARGE OPERANDS

[75] Inventors: Eran J. Dariel, Raanana; Carmi D. Gressel, D.N. Negev, both of Israel

[73] Assignee: Fortress U&T (2000) Ltd, Beer-Sheva, Israel

[21] Appl. No.: 844,511

[22] Filed: Mar. 2, 1992

[30] Foreign Application Priority Data

Mar. 4, 1991 [IL] Israel ........................................ 97413

[51] Int. Cl.[5] .............................................. H04L 9/04
[52] U.S. Cl. ...................................... 380/30; 364/759
[58] Field of Search ................. 380/30; 364/754, 757, 364/759, 760

[56] References Cited

U.S. PATENT DOCUMENTS

| | | | |
|---|---|---|---|
| 4,351,982 | 9/1982 | Miller et al. | 380/30 |
| 4,870,681 | 9/1989 | Sedlak | 380/30 |
| 4,891,781 | 1/1990 | Omura | 380/30 |
| 5,101,431 | 3/1992 | Even | 380/30 |
| 5,121,429 | 6/1992 | Guppy et al. | 380/30 |

OTHER PUBLICATIONS

"VLSI Implementation of Public-Key Encryption Algorithms," Orton et al., *Advances in Cryptology, CRYPTO '86, Proceedings*, pp. 277–301.

"A Programmable VLSI Architecture for Computing Multiplication and Polynomial Evaluation Modulo a Positive Integer," Lu et al., *I.E.E.E. Journal of Solid-State Circuits*, 23, Feb. 1988, No. 1, pp. 204–207.

"Systolic Modular Multiplication," S. Even, *Advances in Cryptology-CRYPTO '90 Proceedings*, pp. 619–624.

"A Cryptographic Library for the Motorola DSP56000," Duss et al., *Advances in Cryptology-EUROCRYPT '90 Proceedings*, Denmark, May 1990, pp. 230–244.

"THAM 11.2: A 3.1ns 32b CMOS Adder in Multiple Output Domino Logic," Hwang et al., *IEEE International Solid-State Circuits Conference*, No. 31, Feb. 17–19, 1988, pp. 140-141-332-333.

*Primary Examiner*—Salvatore Cangialosi
*Attorney, Agent, or Firm*—Merchant & Gould, Smith, Edell, Welter & Schmidt

[57] ABSTRACT

Microcircuit means for the implementation of RSA encryption and decryption transformations are described, which consists of a plurality of units, to which external adders are attached, thereby incorporating the RSA function.

16 Claims, 16 Drawing Sheets

MICROCIRCUIT FOR THE IMPLEMENTATION OF RSA ALGORITHM AND ORDINARY AND MODULAR ARITHMETIC, IN PARTICULAR EXPONENTIATION, WITH LARGE OPERANDS

FIELD OF THE INVENTION

This invention relates to microcircuit means for the implementation of RSA encryption and decryption transformations and other cryptographic large operand operations.

BACKGROUND OF THE INVENTION

The algorithm which the invention is intended to implement is known in the art and was described in: R. V. Rivest, A. Shamir and L. Adleman, "A Method for Obtaining Digital Signatures and Public Key Cryptosystems", Comm. ACM, vol. 21, pp. 120–126, 1978. Its implementation involves exponentiation and modulo reduction, as indicated by the formula:

$M^E \bmod N = C$, and also many other large operand algorithms suggested in the art and by standardization organizations, which necessitate conventional and modular arithmetic. The arithmetic process involved is modulo multiplication, which requires addition, subtraction and shifting.

FIG. 1, attached hereto, illustrates the flow chart of the algorithm for operands which are no larger than the registers. Therein M indicates the message, N the modulo, and E the exponentiation key. The implementation of the algorithm essentially requires six registers. Since the data block, the exponentiation and modulo reduction whereof are to be carried out, may comprise a large number of bits, e.g. several hundreds, the microcircuits required to implement it in the way practiced in the prior art may become quite expensive, because the registers become accordingly larger and require relatively large silicon surfaces, the cost of which, as well known to persons skilled in the art, increases dramatically with the increase in size.

The circuit also enables the encryption and decryption of messages whose size is larger than that of the registers. This is to be done by an interleaved Montgomery reduction, as known in the art [P. L. Montgomery, "Modular Multiplication Without Trial Division", Mathematics of Computation, vol. 44, pp. 519–521, 1985.], and/or by utilizing a novel approach to processing of double precision operands by single precision hardware. In particular, the circuit naturally enables the calculation of $J = -N^{-1} \bmod 2^L$, where N is the modulus and L is the word size. The value of J is necessary for divisionless modular exponentiation as known to experts in the art. Also in particular, the circuit enables a double precision division.

SUMMARY OF THE INVENTION

It is a purpose of the invention to provide microcircuit means, for the implementation of the algorithm described, which are free from the disadvantages of the prior art.

Particularly, it is a purpose of the invention to provide microcircuit means of the kind described which are compact in size and are able to accommodate large data blocks without excessively increased costs.

It is a further object of the invention to provide such microcircuit means which are more economical and convenient to manufacture than those available in the prior art.

It is a further object of the invention to provide means for using larger keys than those specified by the registers sizes, by enabling a natural implementation of the Montgomery algorithm or a double precision modular arithmetic without adding a large amount of hardware.

These and other objects of the invention will become clear as the description proceeds.

The microcircuit according to the invention is characterized in that it consists of a plurality of identical cells, to which extra unifying hardware, in the form of adders, is attached, altogether implementing the RSA function. Accordingly, each cell comprises a 1-bit slice of the required registers.

Microcircuit means according to the invention may be constructed from a plurality of cells connected in series with the required adders, which, by using tailored switching circuitry, afford a plurality of arithmetic operations.

In a form of the invention, secondary modular units are provided, which comprise a number of cells, e.g. 4 cells, with the required common adder or adders, thereby originating a 4-bit secondary modular unit. A number of these latter may be likewise combined, with the required common adder or adders, to provide a tertiary, e.g. 16-bit, (modular) unit. In general, a microcircuit according to the invention may comprise N units, each comprising n primary units and being therefore an n-bit unit, where "n" is preferably a multiple of 4.

The implementation of the algorithm requires, in addition to the registers, 1, 2 or 3 suitable adders. Secondary and tertiary or even larger modular units or cells may comprise a single adder or a plurality thereof, these alternatives giving rise to a variety of embodiments of the invention. CLA (Carry Look Ahead) adders are preferably used and reference is made to them hereinafter; however, any other type of adder might be used instead.

The invention will be better understood from the description of a number of embodiments, with reference to the drawings, wherein:

DETAILED DESCRIPTION OF PREFERRED EMBODIMENTS

In the embodiments described, the microcircuit according to the invention which constitutes the modular exponentiator includes six shift registers, which are assumed to be hundreds of bits long, and the adders. The six registers are:

1) E register—Cyclic Left shifting register for storing and shifting the d/encryption key E.
2) M register—Cyclic Right shifting register for storing and shifting the message M.
3) C register—Right shifting register for storing the multiplicative accumulator.
4) S register—Right shifting register for storing the adder's result.
5) B register—Left shifting register for holding the multiplicand.
6) N register—Right shifting register for storing the inverted modulo number N.

The adders perform the following additions:
1) $S+B$
2) $S-N$
3) $2B-N$

Two counters—P and M—and a small ROM (Read Only Memory) control the operation of the microcircuit.

Counter P is the power counter for counting the number of encryption key bits processed.

Counter M is the multiplier counter for counting the number of multiplier bits used.

Figure 1:
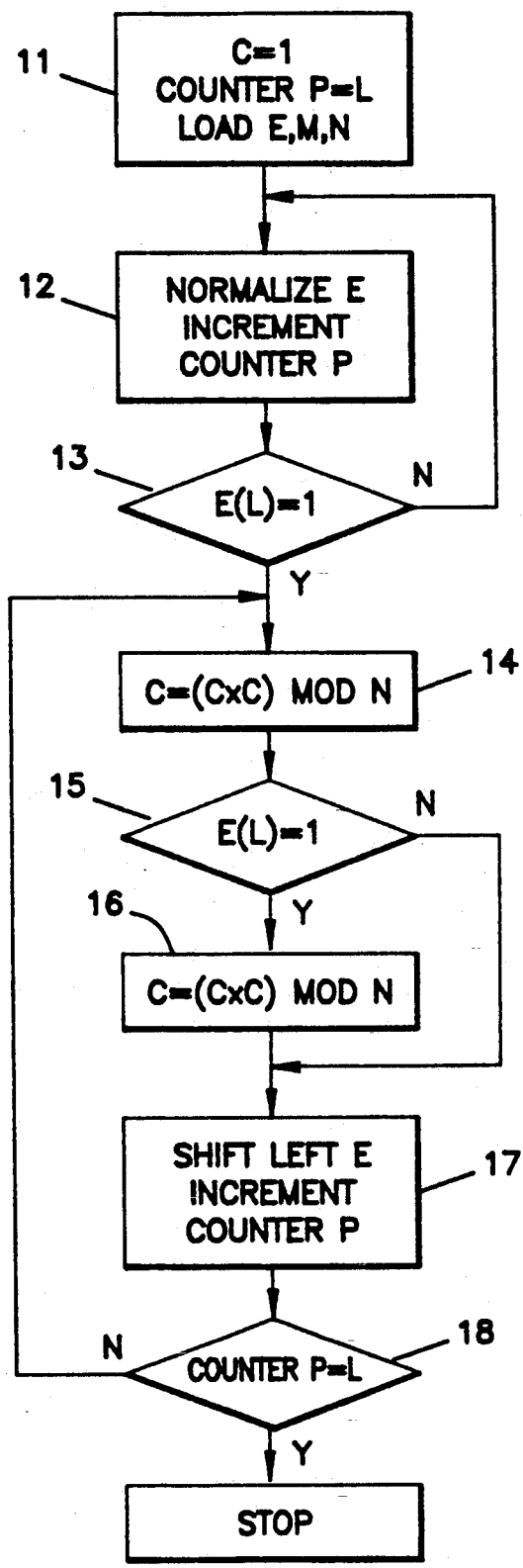
FIG. 1 is a flow chart of the modular exponentiation algorithm which the invention implements: as $M^E \bmod(N)$.

FIG. 1, as stated hereinbefore, is the flow chart for calculating $C = M^E \mod(N)$, as described in the cited prior art. The various stages represented on the flow chart carry out the following operations. At 11 the circuit is initialized.

Power counter P is loaded with the encryption key length.

Multiplier counter M is reset to zero.

Register E is loaded with the encryption key.

Register N is loaded with the modulo number.

Register M is loaded with the message.

Register S is reset to zero.

Register C is set to binary value of 1.

At 12, 13: If the power counter was not set to the correct power length, a normalizing process takes place. Register E is shifted to the left until a binary "1" is located in its MSB (Most Significant Bit) position. In addition, for each shift the power counter is decremented by one.

At 14: The squaring of the content of register C is performed. Further details of the multiplication process are described in FIGS. 2 and 3.

At 15: Depending on the MSB bit of register E, stage 16 is performed or not.

At 16: The modular multiplication of registers C and M is performed.

At 17: The shifting of register E is performed. Consequently the next E bit is positioned at the MSB position, and according to its value the next (C*M)mod(N) will be performed. In addition, counter P is decremented.

At 18: If counter P reached its final state, the encryption process is terminated.

The flow of this diagram is implemented by using a state machine based on a ROM. This state machine supplies all the control signals to the whole circuit. The description of each control signal is detailed in the following figures.

Figure 2:
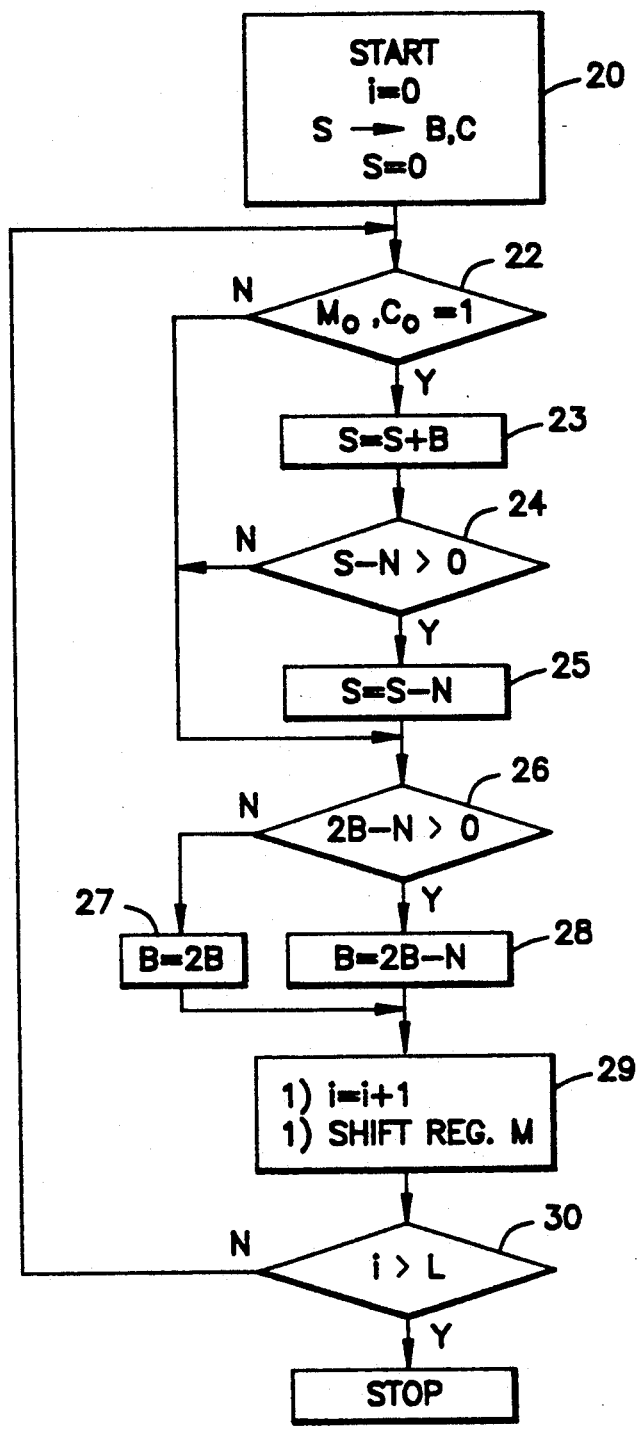
FIG. 2 is a flow chart illustrating modular multiplication $(M*C) \bmod(N)$ using one adder.

FIG. 2 describes the flow chart for performing the serial multiplication process using one adder.

At 20: The content of register S is loaded into registers C and B, and S is reset to zero.

At 22: Either the M register MSB (Least Significant bit), while performing (M*C)mod(N), or the LSB bit in register C, if performing (C*C)mod(N), determines whether to perform stages 23, 24, 25) or not.

At 23: The first addition of the contents of registers S and B. The result goes back to register S. $(S+B) \rightarrow S$.

At 24, 25: Here the second addition takes place. The modulo reduction is performed where N is subtracted from the (S+B) result, which is stored back in register S. The result S or (S−N) stored back in register S depends on the carry bit value.

At 26, 27, 28: Performing the third addition, register B is shifted to the left, thus multiplying it by 2. Then N is subtracted from it. Again, the result 2B or (2B−N) is stored back in register B depending on the carry.

The operations S−N and 2B−N ensure that no value stored in registers S and B during the entire modular multiplication operation ever exceeds the modulo N.

At 29: The M counter is incremented by 1.

At 30: The M counter is tested to see if it reached the final count.

Figure 3:
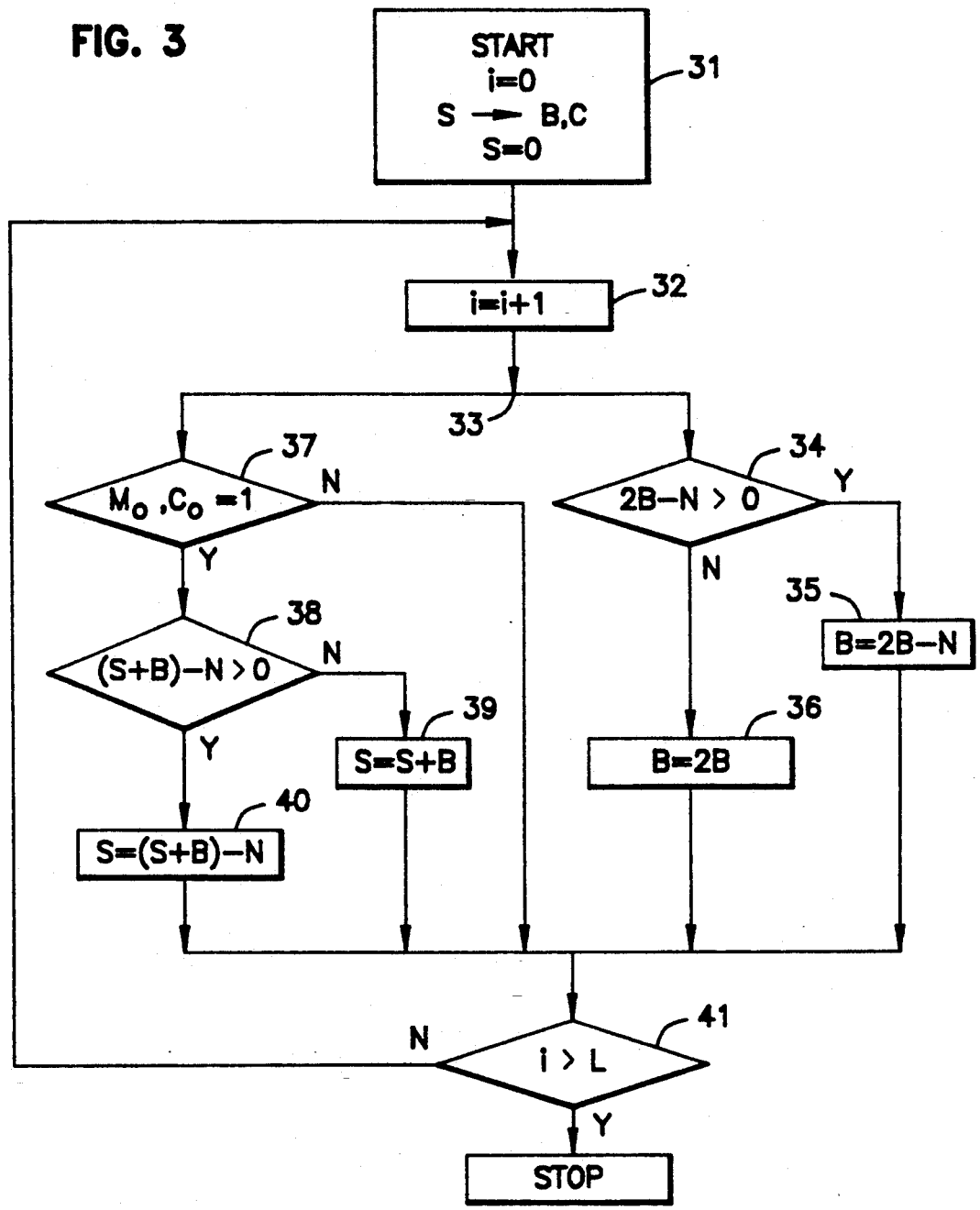
FIG. 3 is a like flow chart illustrating the same modular multiplication $(M*C) \bmod(N)$, but using two or three adders.

The flow chart FIG. 3 describes a multiplier for obtaining the same result using two parallel adders.

The purpose of having two parallel adders (and later, having three parallel adders) is to expedite the process (at the expense of adding hardware).

At 31: The content of register S is loaded into registers C and B, and S is then reset to zero.

At 32: The multiplying counter M is incremented.

At 33: From this stage, two parallel processes are performed.

At 34, 35, 36: Right branch—the content of register B is modulo multiplied by 2.

At 37, 38, 39, 40: Left branch—According to the multiplicand's LSB bit, in register M or C the modulo addition of S and B is performed.

The two additions required for performing $S=(S+B)$ and $B=2B$—are done in parallel using the two adders, while the third addition, which requires the result of S+B for performing $S=(S+B)-N$ is done in series after the result of $S=S+B$ is stored back in register S.

At 41: Counter M is checked to see if it reached its final count.

The flow chart of FIG. 3 also describes a multiplier using three parallel adders.

The only difference, with respect to the case of two adders is that during stages 37, 38, 39, 40, all the additions are operated simultaneously in one clock cycle, using the three adders. 1) S+B 2) S−N 3) 2B−N. In both additions 2) and 3), N is subtracted or not according to the carry bit.

Figure 4:
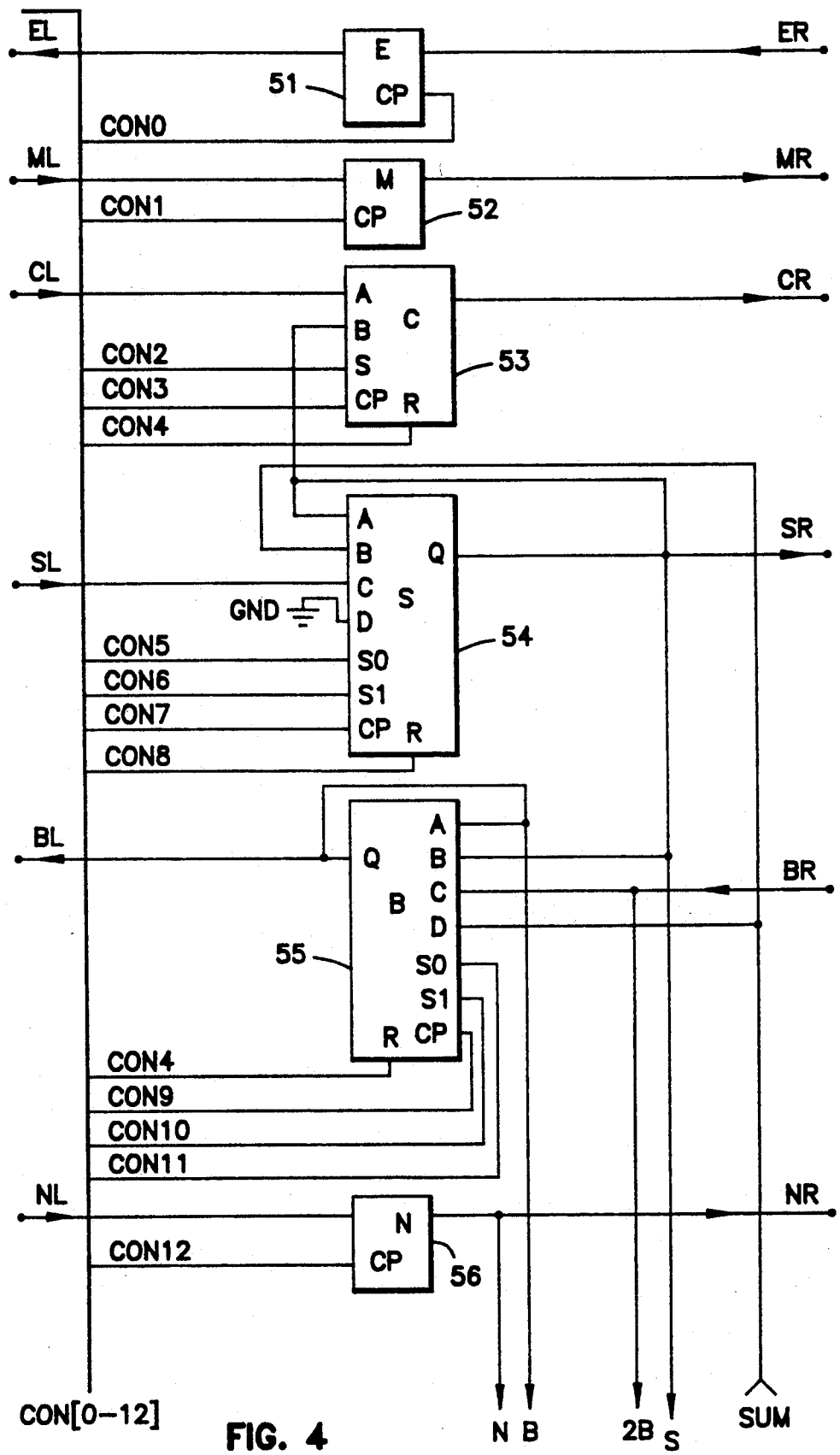
FIG. 4 schematically illustrates a cell according to an embodiment of the invention.

FIG. 4 illustrates a cell, according to an embodiment of the invention. All the 13 signals are generated in a control block. The cell contains the following six registers:

51) E: flip-flop (FF) part of the left shifting E register.
52) M: FF out of the right shifting M register.
53) C: scan FF out of the right shifting C register. It can also be loaded from the S register.
54) B: FF with a 3→1 mux on its data input. It selects one of three possible inputs: a) the addition result; b) the previous S; and c) shift right option (used for loading and unloading of data).
55) B: FF with a 4→1 multiplexer on its data input. The mux selects one of four possible inputs: a) B=B; b) B=2B; c) B=2B−N; and d) B=S.
56) N: FF out of the right shifting N register.

The outputs toward the adders are: a) B; b) 2B; c) N; d) S. The input SUM is the sum result of the addition.

The control bus (13 signals wide—CON[0:12] supplies all the control signals to the elements in the cell.

The signals connected to the cell adjacent on the left are marked EL, ML, CL, SL, BL, NL.

The signals connected to the cell adjacent on the right are marked ER, MR, CR, SR, BR, NR.

The signals connected to the adder are on the bottom of the cell. The signals S, B, N, 2B are one bit slice of the operands, that the adder uses, in particular for the RSA algorithm on normal register operands, for executing: S+B, S−N, 2B−N. The SUM input is the adder's result.

Element 51 is one F.F of an L bit long left shifting register (E). Its data input is ER and output EL. Signal CON0 is the clock signal, which advances the shift register.

Element 52 is one F.F of an L bit long right shifting register (M). Its data input is ML and output MR. Signal CON1 is the clock signal, which advances the shift register.

Element 53 is one F.F with a 2 to 1 multiplexer on its data input out of an L bit long right shifting register (C). Signal CON2 selects which input will be loaded to the F.F:
a) CL—output from adjacent cell on the left.
b) S—value in register S.

Signal CON3 is the clock which loads the selected data into the F.F. Signal CON4 resets the register.

Element 54 is one F.F with a 3 to 1 multiplexer on its data input out of an L bit long right shifting register (S). Signals CON5 and CON6 select which input will be loaded to the F.F:
a) S—previous value
b) SUM—adder's result.
c) SL—output from adjacent cell on the left.

Signal CON7 is the clock which loads the selected data into the F.F. Signal CON8 resets the register.

Element 55 is one F.F with a 4 to 1 multiplexer on its data input out of an L bit long left shifting register (B). Signals CON10 and CON11 select which input will be loaded to the F.F:
a) B—previous value.
b) S—content of register S.
c) BR—output from adjacent cell on the right.
d) SUM—adder's result.

Signal CON9 is the clock which loads the selected data into the F.F. Signal CON4 resets the register.

Element 56 is one F.F of an L bit long right shifting register (N). Its data input is NL and output NR. Signal CON12 is the clock signal, which advances the shift register.

The uniqueness of the complete solution lies in this cell, which enables to perform the complete algorithm, with all the connection between the registers to be limited to within the cell. Handcrafting the layout of this cell into small silicon area and making sure that the inputs on the left side of the cell match the outputs of the cell on the left, and having the same for the right side, will make the task of generating a complete L bit solution very compact and straightforward. Similarly, connections to the adder and feedback to the accumulating registers are efficiently enabled.

Figure 5:
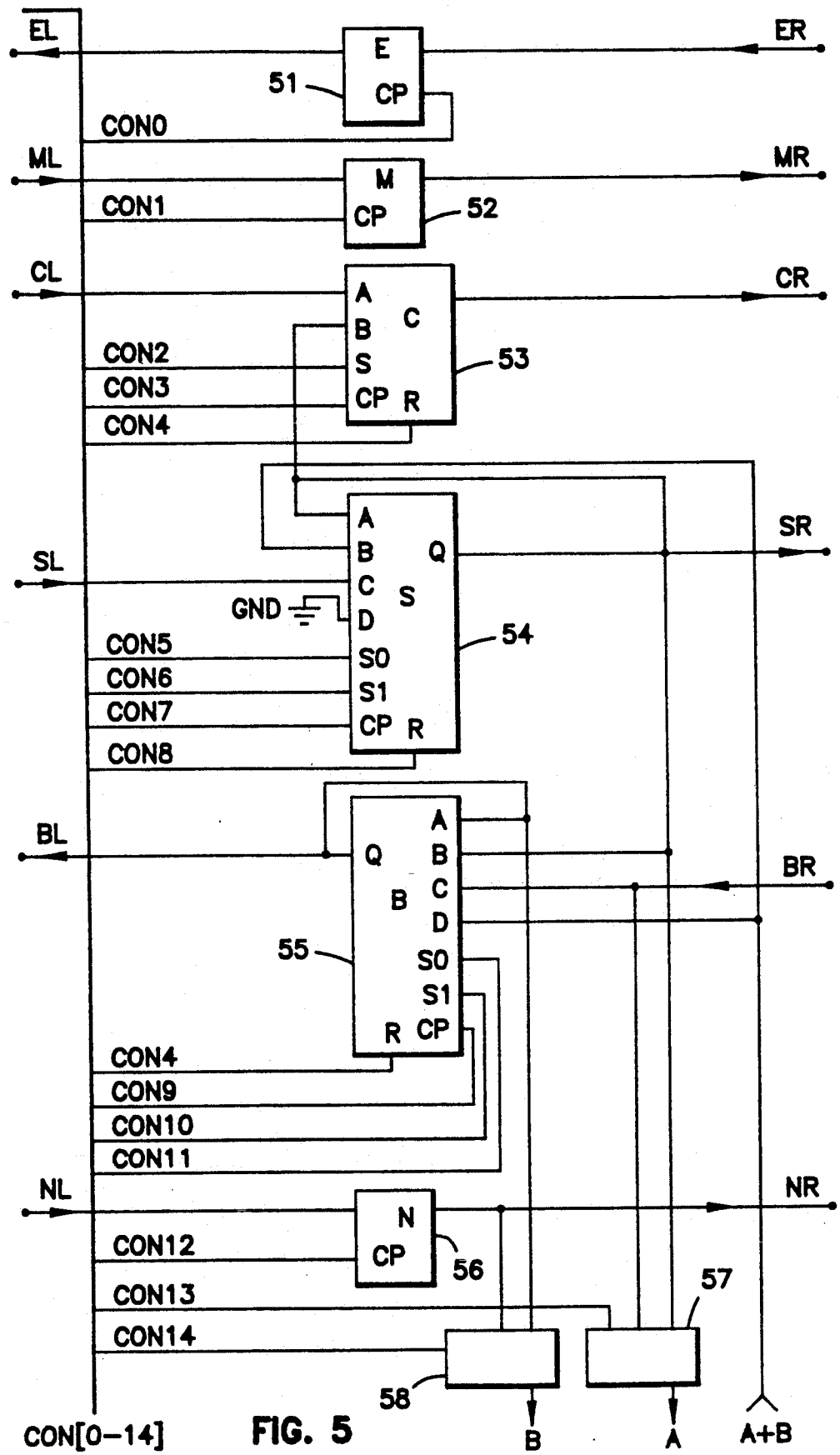
FIG. 5 schematically illustrates a cell according to an embodiment of the invention, in which embodiment one adder is used.

FIG. 5 is similar to FIG. 4, but includes two 2 to 1 multiplexers. The two multiplexers, controlled by signals CON13 and CON14, select which of the following additions will be performed:
a) S+B;
b) S−N;
c) 2B−N.

The complete block diagram of FIG. 2, which exhibits a modular multiplication process, is implemented in FIG. 5 as follows:

The numbering of the following blocks refers to FIG. 2. The implementations refer to FIG. 5.

Block 20 is implemented by having the result of the previous modular multiplication process which resides in register S, move to both registers B and C. This is done prior to the resetting of register S. The move is done as follows:

Signal CON2 selects the output of register S to be loaded into register C.

Signals CON10 and CON11 select too the output of register S to be loaded into register B.

During the next block cycle signal CON9 resets register S.

Block 22 is implemented by checking the rightmost output of either register C or M, depending on whether a (C×C) mod N or (M×C) mod N are required.

Block 23 is implemented as follows:

Signal CON13 selects the contents of register S to output A.

Signal CON14 selects the contents of register B to output B.

Signals CON5 and CON6 select the output of the adder (A+B) to be loaded into register S.

Blocks 24 and 25 are implemented as follows:

Signal CON13 selects the contents of register S to output A.

Signal CON14 selects the contents of register N to output B. (N is represented in its 2-complement form.)

Signals CON5 and CON6, which are a function of the carry bit, will select which result will be loaded into register S. (S−N) is loaded if S>N, and S is loaded if S≤N.

Blocks 26, 27, 28 are implemented as follows:

Signal CON13 selects the contents of register B to output A, but by using the output of FF B from the cell on the right, instead of the FF in this cell, which generates 2B.

This consideration exemplifies one of the main approaches unique to the invention. That is, aiming the design toward cellular implementation.

Signal CON14 selects, as explained before, the contents of register N to output B.

Signals CON10 and CON11, which are a function of the carry bit, will select which result will be loaded. (2B−N) is loaded if 2B>N, and 2B is loaded if 2B≦N.

By adopting the above approach, the invention enables to implement within a cell, and by using one external adder, all the operations needed for a complete modular multiplication process.

Figure 6:
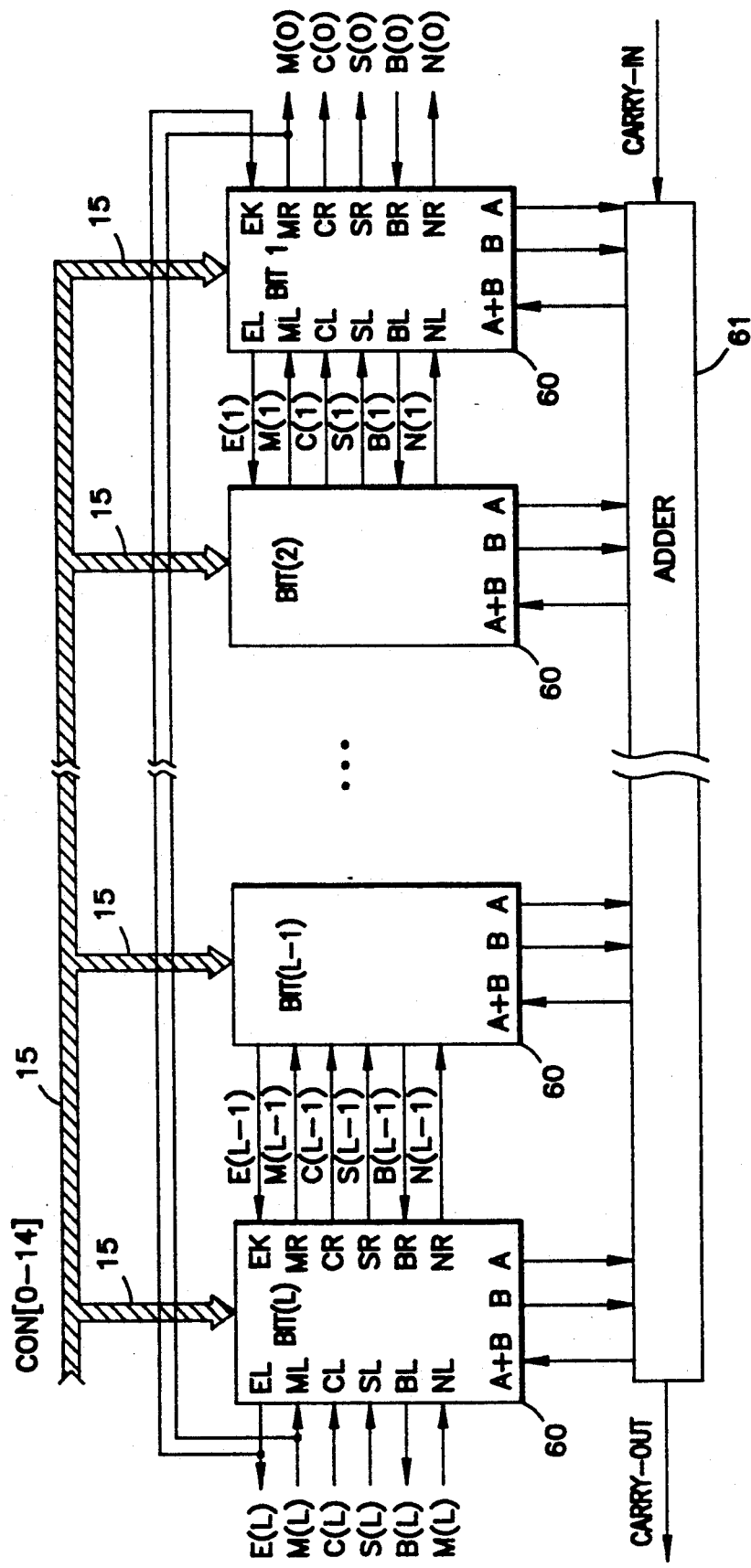
FIG. 6 is a complete L-bit long block diagram including one adder.

FIG. 6 describes the L-bit long solution. The cells or cells, such as the cells of FIG. 5 indicated at 60, are connected in series, while the signals needed for the adder 61 are extracted from the bottom of each cell. This approach prevents large routing overhead, since all the signals are localized. Between the cells only six signals are transmitted, and these, with correct layout of the individual cells, require no routing.

Figure 7:
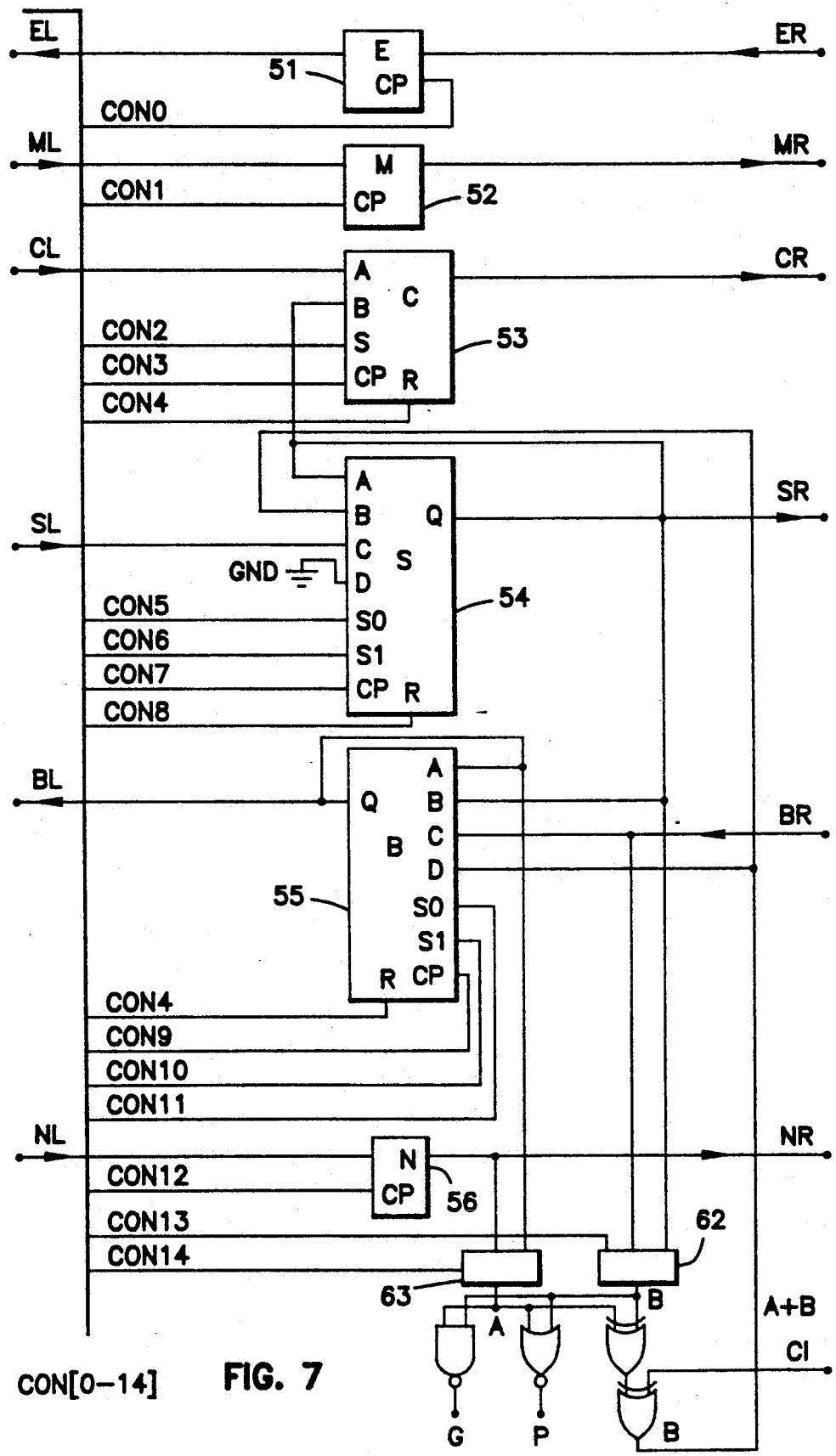
FIG. 7 schematically illustrates a cell according to an embodiment in which one CLA adder is used.

FIG. 7 describes a single-bit cell, wherein use is made of a CLA type adder. Numerals 51 to 56 designate the same registers as in FIGS. 4 and 5, and 62 and 63 indicate two multiplexers. The cell includes the necessary logic for producing the Generate and Propagate signals for the L-bit long CLA adder, and the carry logic.

Figure 8:
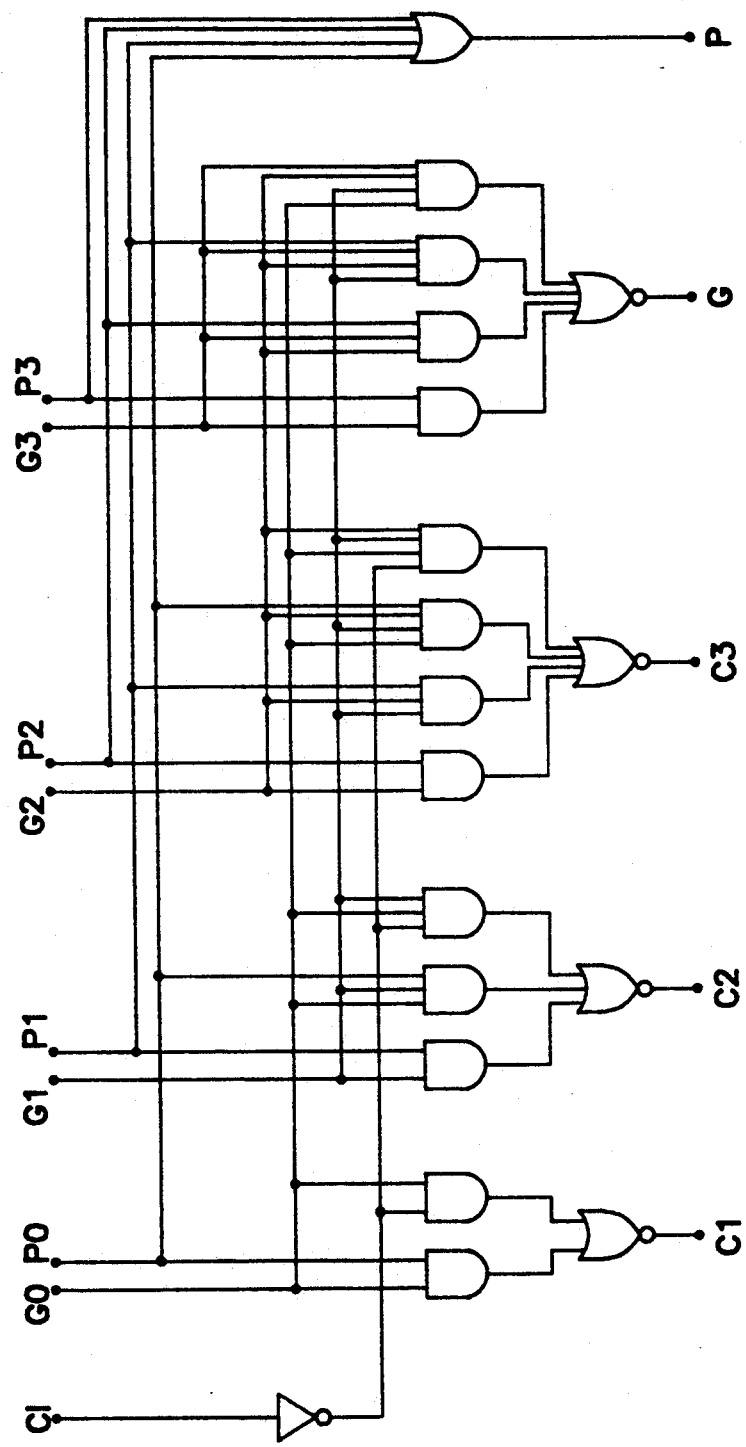
FIG. 8 illustrates a 4-bit CLA secondary modular unit.

FIG. 8 illustrates the logic implementation of a 4 bit secondary modular unit with CLA adder. The drawing is self-explanatory.

Figure 9:
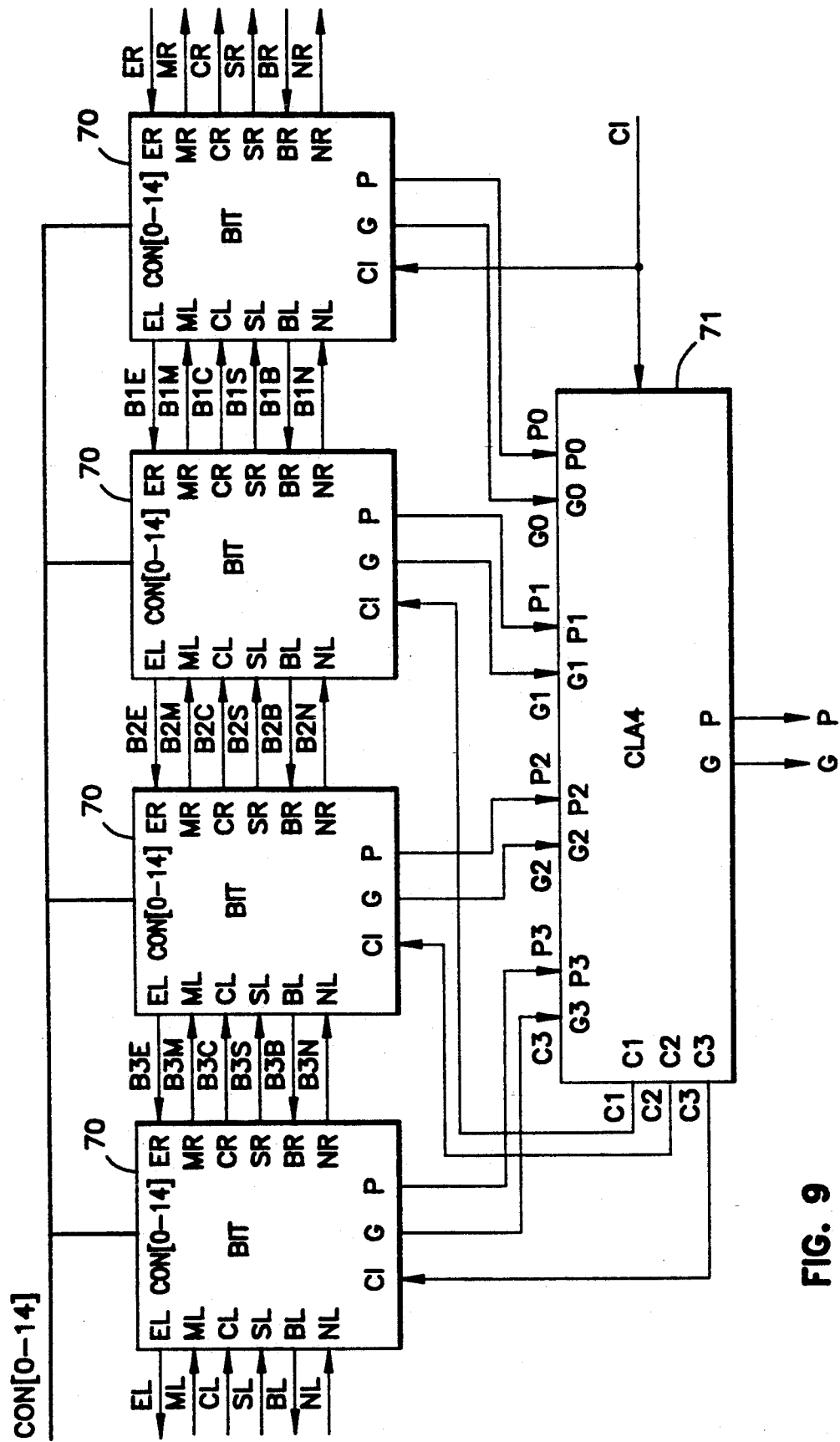
FIG. 9 illustrates a 4-bit modular unit including 4 basic cells and a 4-bit CLA.

FIG. 9 describes a 4-bit secondary modular unit, comprising four primary single bit modular units or cells 70 with all the interconnections between the adjacent cells and the 4-bit CLA block 71. The inputs and outputs of this 4-bit unit are identical to the i/o of the single bit cell.

If each cell 70 is substituted in FIG. 9 with a 4-bit secondary modular unit, a 16-bit tertiary unit is obtained. Analogous results are obtained by a similar substitution in any diagram in which single-bit cells appear. If each single-bit unit is substituted with a 16-bit unit, a 64-bit unit is obtained—and so on. Any desired multiple units can be built up in this way.

Figure 10:
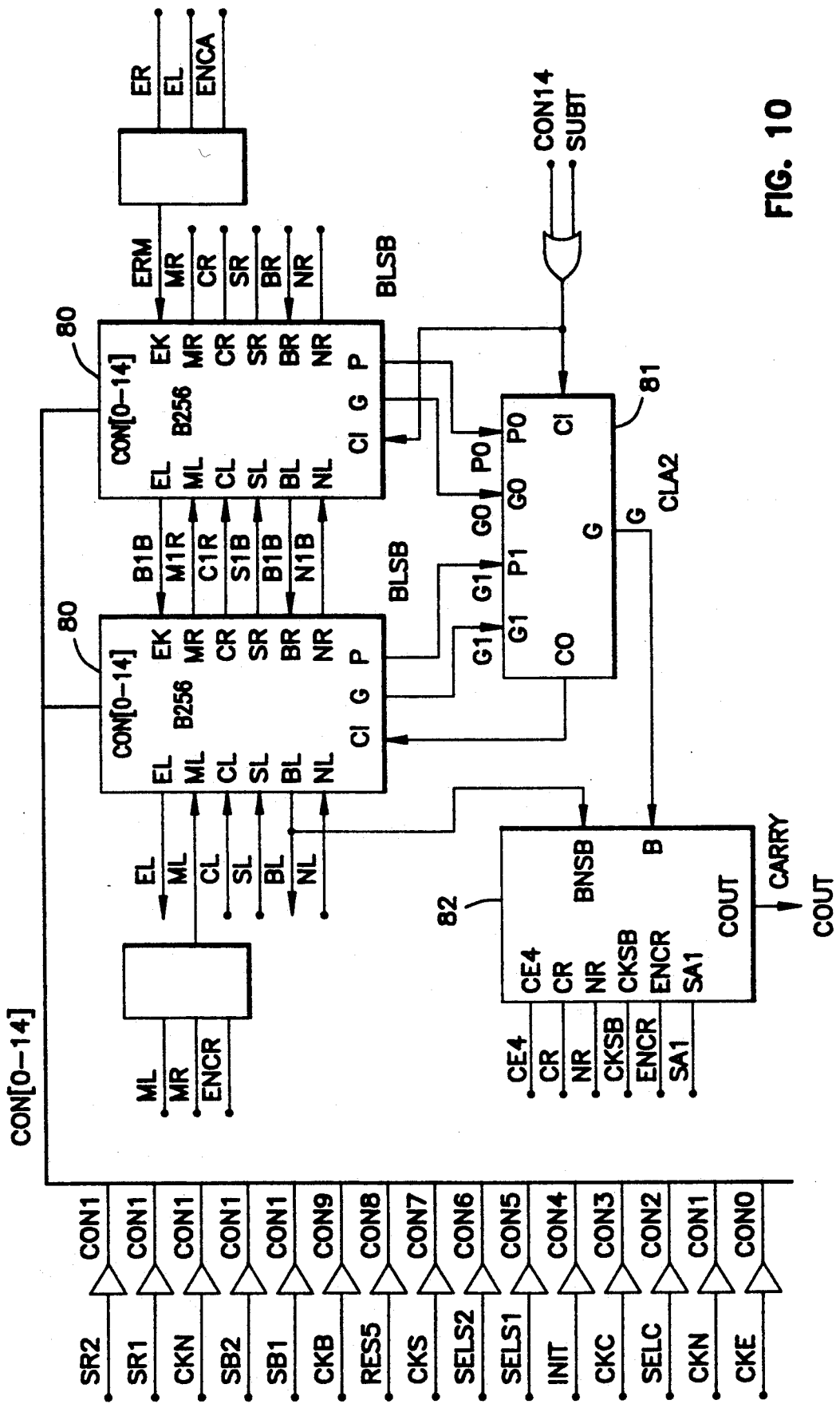
FIG. 10 illustrates a 512-bit long unit.

FIG. 10 describes a 512-bit unit. The design requires two 256-bit units 80 and a 2-bit CLA adders 81. The carry block 82 stores the carry result of the addition for use in the next clock cycle.

Figure 11:
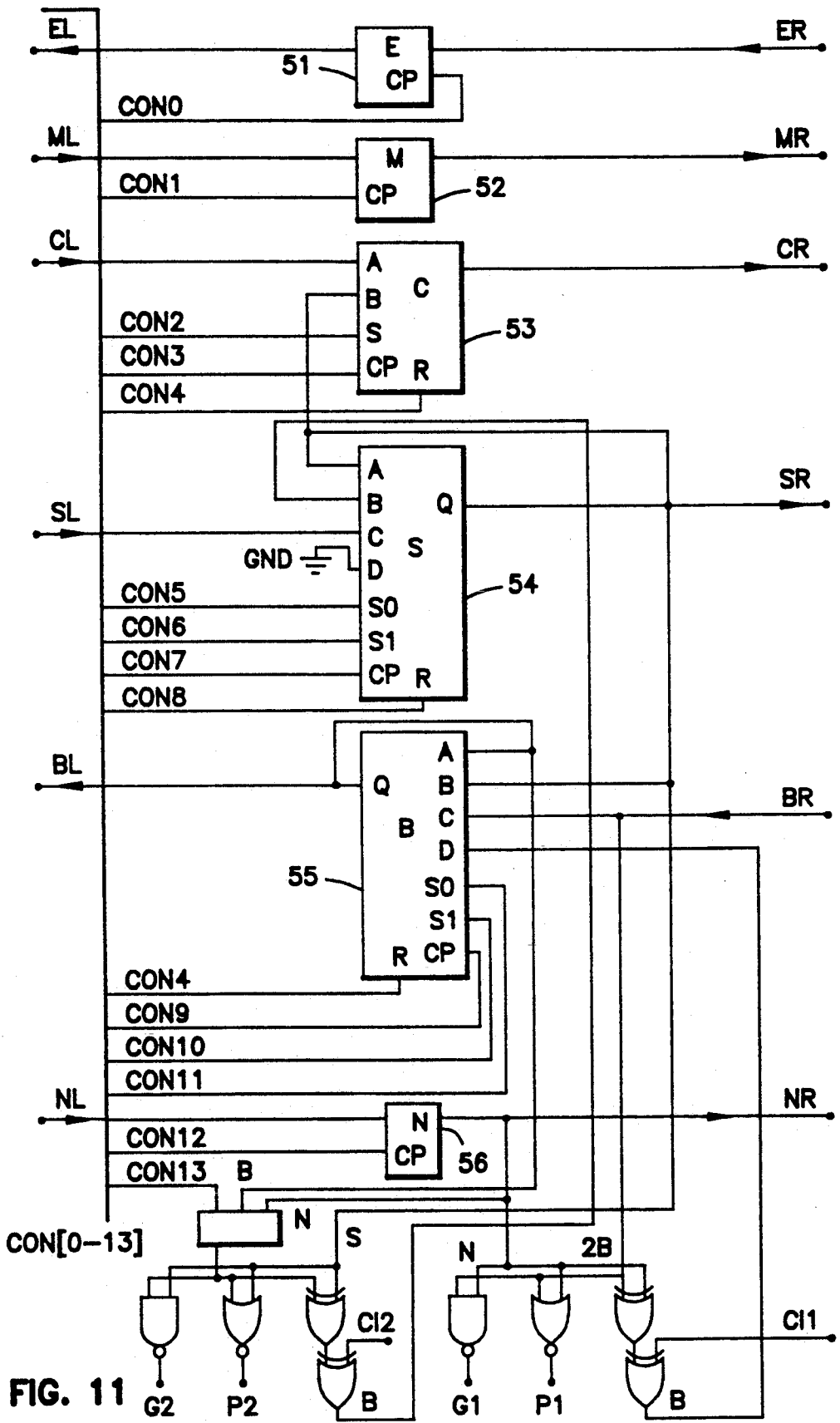
FIG. 11 illustrates a cell according to an embodiment in which two CLA adders are used.

FIG. 11 describes the content of a single-bit cell while using the two adders solution. Registers 51 to 56 correspond to those of FIGS. 4 and 5. The 2→1 mux 83 selects which addition should be performed: a) S+B; or b) S−N. The third addition of 2B−N is done simultaneously with the first S+B addition.

The description of FIG. 4 also holds here, except for a slight difference in which two additions are done simultaneously (2B−N and S+B), as shown in FIG. 3, and thus signals CON13 only select whether to add S+B or S−N. Signal CON14 is not required.

Figure 12:
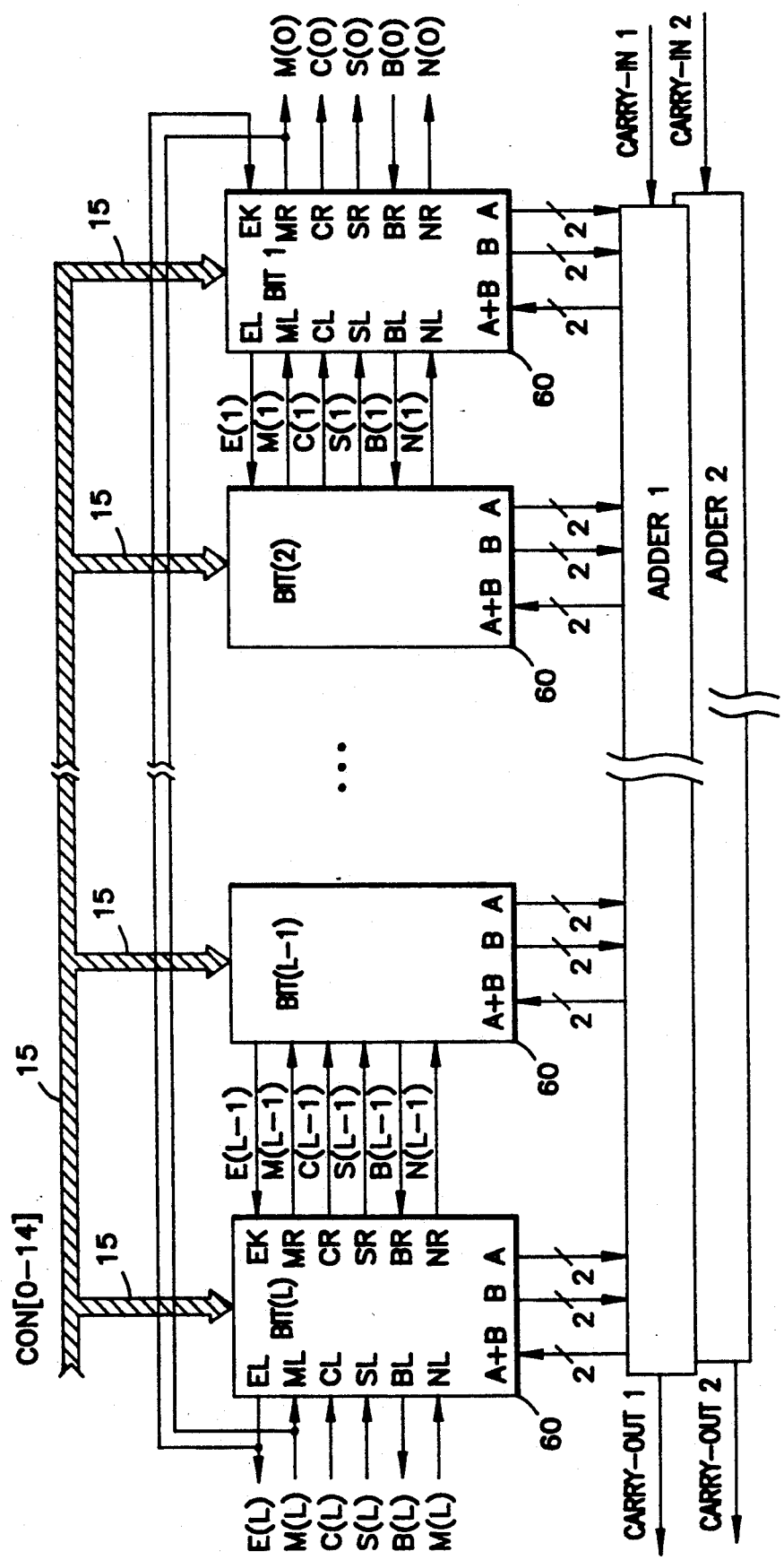
FIG. 12 is a complete L-bit long block diagram of a unit comprising two adders.

FIG. 12 describes the L-bit long solution while using two adders 84 and 85. The cells may be the same as units 60 of FIG. 6.

Figure 13:
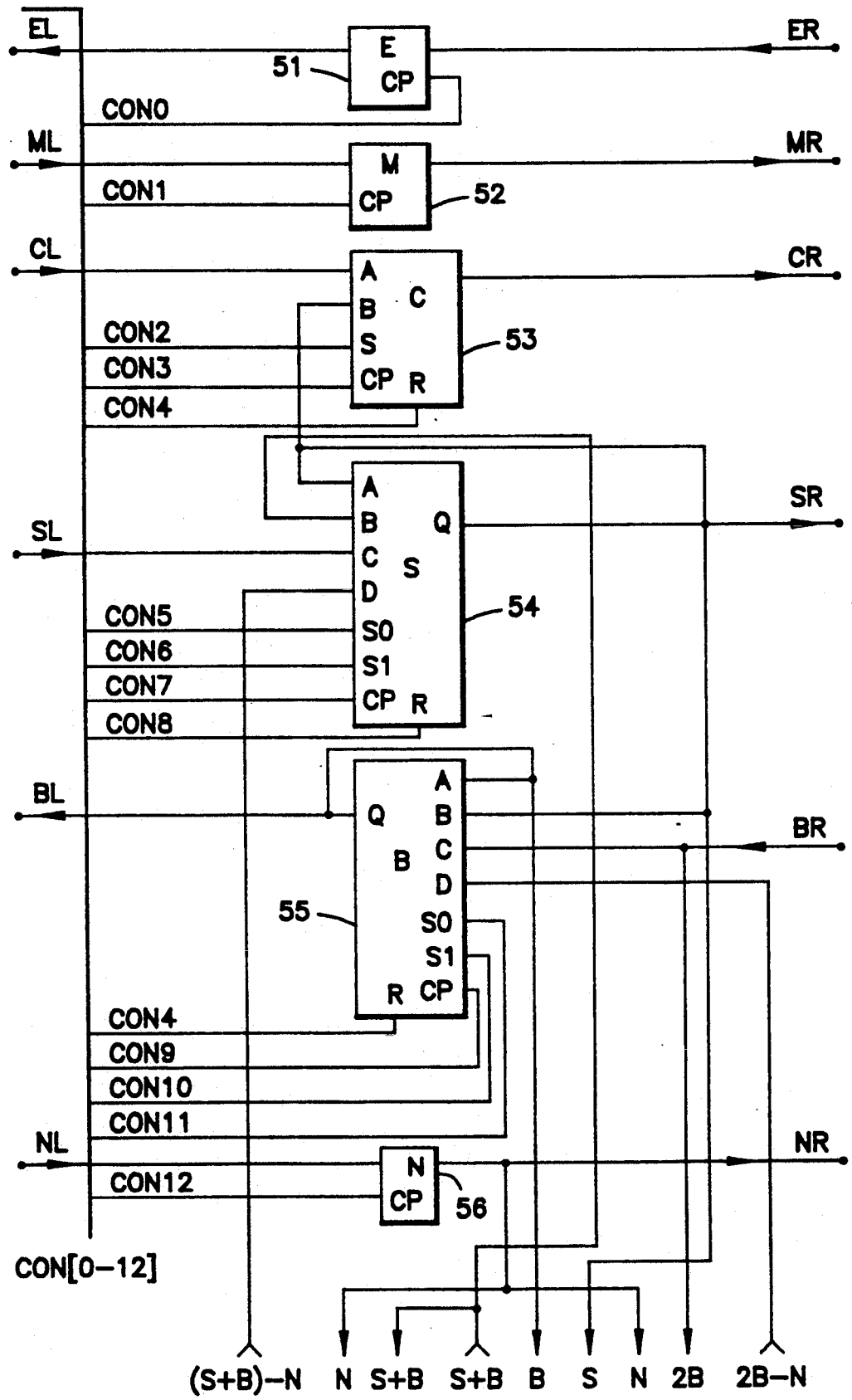
FIG. 13 illustrates a cell according to an embodiment in which three CLA adders are used.

FIG. 13 describes a cell embodying a 3 adder solution. Registers 51 to 56 may be the same as those of FIGS. 4 and 5. Here no mux is required, since all the addition is performed simultaneously. There is no mux on the outputs toward the adder.

The description of FIG. 4 also holds here, except for a slight difference in which all the additions are done simultaneously as shown in FIG. 3, and thus signals CON13 and CON14 are not required.

Figure 14:
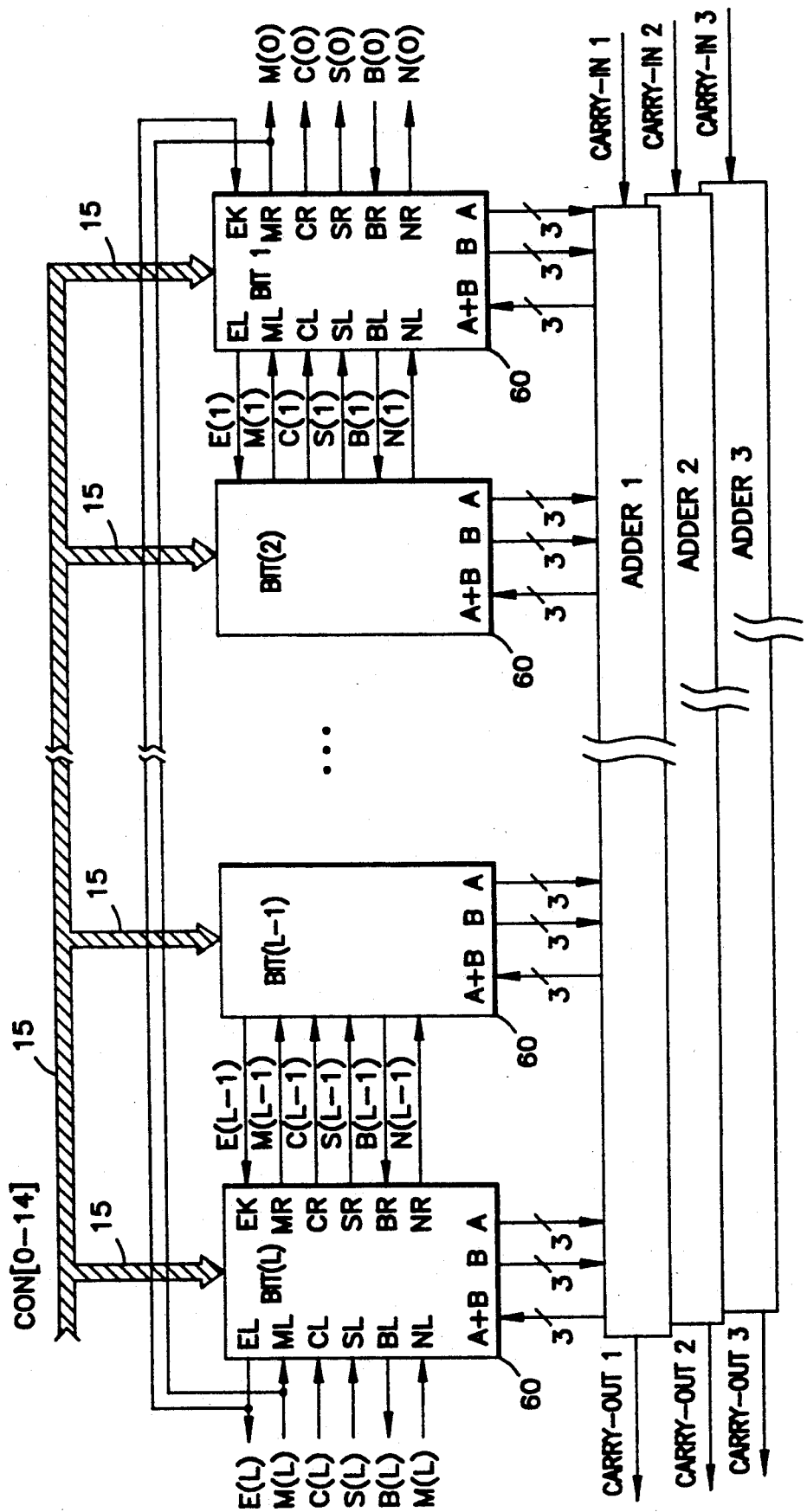
FIG. 14 is a complete L-bit long block diagram of a unit comprising three adders.

FIG. 14 describes the L-bit long solution using three adders 86, 87 and 88. The cells or cells may be the same cells 60 of FIG. 6.

Figure 15:
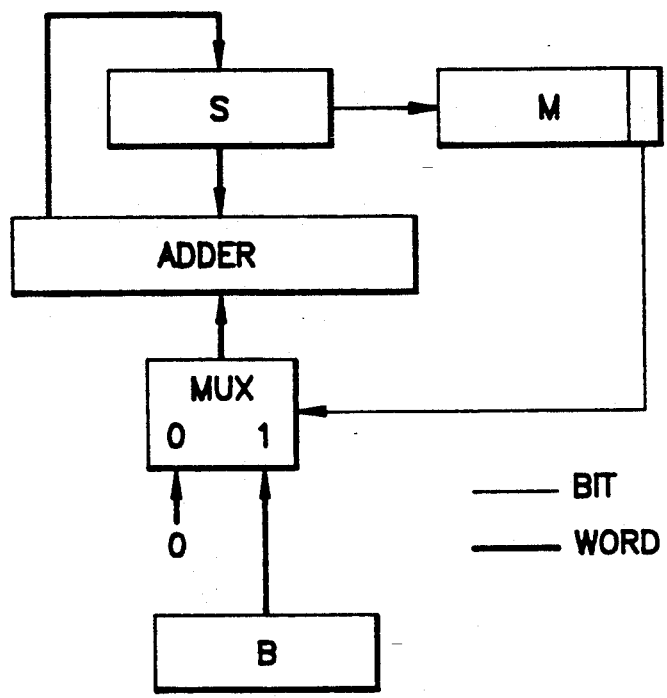
FIG. 15 describes the configuration of the circuit as a multiplier.

FIG. 15 describes a phase of operation of the microcircuit according to the invention, under which a multiplication of two operands, each consisting of L bits, takes place. Such an operation is needed for various applications. The circuit operates in a well known manner, clear to persons skilled in the art.

Figure 16:
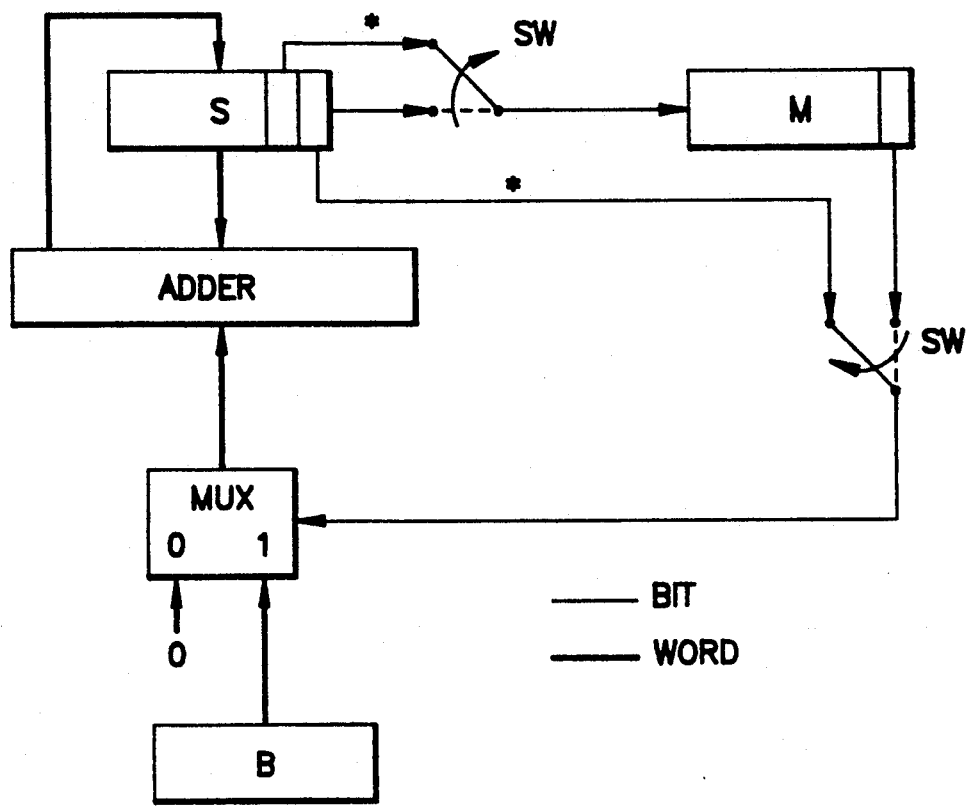
FIG. 16 describes the way the circuit calculates $J = -N^{-1} \mod 2^L$, where N is the modulus and L is the word size.

FIG. 16 describes a phase of operation of the invented microcircuit under which the value $J = -N^{-1} \mod 2^L$, where N is the modulus and L is the word size, is calculated. The advantage in being able to calculate such a value, in order to implement a divisionless modular multiplication of 2L-bit operands, based on Montgomery reduction, is clear to persons skilled in the art.

The circuit of FIG. 16 is a generalization of that of FIG. 15. During one phase of operation, when the switches sw (both operate synchronously) are at the dotted position, the circuit acts as the multiplier of FIG. 15. When the switches sw are at their depicted (solid) position, the circuit generates the value of J, given N. Initially, the second bit from the right in S is set to 1 (the rest are 0), M is set to 0 and B stores N. The process starts with a shift. N is added to the contents of S, and S shifts. This shift and add process continues, where N is added to the contents of S whenever the LSB of S is 1. After m shifts the contents of M is J.

The shift is from the second place in S, since the bits which are dropped out from the least significant place are always 0, and should therefore be shifted into M before being changed by addition of N. Another possibility for generating the bits in M would be to sense the bit at the least significant place in S, before addition takes place, and shift it into M. In this case the initial state of S is 1 as an LSB, and the process starts by sensing this 1 and shifting it into M, before addition of N takes place.

By the use of the circuit of FIG. 16, J is calculated by an operation equivalent to one multiplication.

A possible variation: Having an initial all 0 contents of S and M.

If, for convenient design considerations, it is preferred to have an all 0 contents for the accumulator; this can be achieved by having two 'not' gates in the places marked by * in FIG. 16. The rest of the circuit remains unchanged. The introduction of the 'not' gates may also facilitate the implementation due to pure technological considerations. Note that in this case, N is added to the contents of S for the purpose of generating 1's at the LSB, rather than 0s.

Figure 17:
FIG. 17 describes the configuration of the circuit as a division circuit.

FIG. 17 describes a phase of operation of the microcircuit according to the invention, under which 2L-bit value is divided by L-bit value. The double-precision value $X_2 X_1$ is stored in registers B, E, which shift together to the left. The division operation follows the line in which before each shift B is replaced by B−N if B−N is positive. Here we exploit the feature offered by the microcircuit according to the invention, enabling the replacement of 2B by 2B or 2B−N, depending on the sign bit of 2B−N.

However, the operation offered by the engine is 2B−N, performed after a shift, whereas we need B−N to be performed before a shift. (Note also that if X is the contents of B, then after a shift the contents is 2X+E(n) and not purely 2X, where E(n) denotes the MSB of E, shifted into B). In order to handle this situation, the initial contents of the concatenation B,E will be the double-precision dividend shifted one place to the right. (That is, the MSB in B is 0.) The LSB of E is stored temporarily in a buffer and is shifted into E during the first shift. The operation $2B-N$ performed by the microcircuit according to the invention after each shift is then actually $B-N$ performed before a shift. $L+1$ shifts are however required. The decision on whether to replace B by $B-N$ is done by the original flag.

This operation results a pure division, where the bit $q_i$ of the quotient is 1 or 0 depending respectively on whether N is subtracted at step i or not. That is, $q_i$ is the flag which decides whether 2B is replaced by $2B-N$ or not. The bits of the quotient are generated starting with the MSB. They can be shifted back into E, which is emptied from its left, while being filled in from the right.

Based on the division operation described above it would be possible to perform the operation $A \cdot B \bmod C$ for 2L-bit operands. This way, the circuit can process operands whose length is twice that of the individual registers. For example, for $L=512$, the circuit can perform a modular multiplication of 1024-bit operands. Referring to the following process, the performed operation is $(A_1A_0) \cdot (B_1B_0) \bmod (N_1N_0)$, where $T_i$ is an L-bit value. (It is assumed that the two multiplicands are smaller than the modulus.)

Notation:

$X_iX_jX_k$ or $YX_i$ means a concatenation.

$X_i \cdot Y_j$ or $Y \cdot X_i$ means multiplication.

If Y is obtained from a division of two values then $Y_q$ denotes the quotient part of Y.

Preliminary step: Shift N to the left until its MSB is 1. Denote by i the number of shifts. Shift one of the multiplicands (say A) i places to the left. $N_1N_0$ and $A_1A_0$ refer to N and A after the shift. (Note that since $A<N$, it is impossible that shifting A i places to the left results an overflow.)

Step 1

$X = A_1 \cdot B$.

$Y = X_2X_1 : N_1$.

$Z = X - Y_q \cdot N$. If Z is negative then $Z = Z+N$.

$S_1 = Z \cdot 10$.

Step 2

$X = S_1 + A_0 \cdot B$. $C_{out}$ denotes the value of the carry generated beyond a three character result.

$X_2X_1 = C_{out}X_2X_1 - C_{out}N$ $Y = X_2X_1 : N_1$. $C_{out}$ denotes the value of the carry generated beyond a one character $Y_q$.

$X_2X_1 = X_2X_1 - C_{out} \cdot N$, $Y_q = Y_q - C_{out} \cdot 10$.

$Z = X - Y_q \cdot N$.

If Z is negative then $Z = Z+N$.

If Z is negative then $Z = Z+N$.

If Z is negative then $Z = Z+N$.

Shift Z i places to the right.

$Z = A \cdot B \bmod N$.

An alternative process.

Preliminary step: N and A are moved as before.

Step 1

$X = A1 \cdot B$.

$Y = X_2X_1 : N_1$.

$Z = X - Y_q \cdot N$. If Z is negative then $Z = Z+N$.

Step 2

$Y = Z : N_1$.

$Z = Z0 - Y_q \cdot N$. If Z is negative then $Z+Z+N$.

Step 3

$X = Z + A_0 \cdot B$.

$Y = X_2X_1 : N_1$. $C_{out}$ denotes the value of the carry generated beyond a one character $Y_q$.

$X_2X_1 = X_2X_1 - C_{out} \cdot N$, $Y_q = Y_q - C_{out} \cdot 10$.

$Z = X - Y_q \cdot N$.

If Z is negative then $Z = Z+N$.

If Z is negative then $Z = Z+N$.

Shift Z i places to the right.

$Z = A \cdot B \bmod N$.

The division operation used in the process, which is facilitated by the circuit of FIG. 17, is $X_2X_1 : N_1$.

Some further points concerning the unique features of the circuit according to the invention, enabling the execution of $X_2X_1 : N_1$:

a) Concerning the $L+1$ shifts executed during the division of L-bit operands: The operation 2B-N performed after the first shift is $X_2 - N_1$. When this operation is performed in Step 1, it is ensured that $X_2 < N_1$, and the first generated $q_i$ is the second Cout.

b) A possibility for doing without the connection from register E to B: Yq was defined as the quotient obtained from the operation $Y = X_2X_1 : N_1$. Let $Y_q'$ denote the quotient obtained from the operation $X_2O : N_1$. That is, $X_1$ is replaced by Os. $Y_q'$ is generated by register B, with 0's shifted into it. Here we can implement the original functioning of B, that is, B is replaced by $2B-N$ or not, depending on the sign of $2B-N$. $Y_q' = Y_q$ or $Y_q' = Y_q - 1$, depending on whether $X_1 < N_1$ or not. If we prefer to use $Y_q'$, thus saving the connection of registers E to B, Steps 1 and 2 should be modified. The operation $Z = X - Y_q \cdot N$ should be extended to: $Z = X - Y_q \cdot N$. If $Z > N$ then $Z = Z - N$.

c) Concerning the operation $Y_q \cdot N$:

Yq resides in register E which is a left shift register. When multiplying Yq by a number, Yq is shifted out of E starting with its MSB. This could cause some difficulties in the multiplication. However, shifting the contents of E into B (which justifies again the connection B←E) solves this problem, since the engine naturally handles a multiplication in which one of the multiplicands is in B.

While a number of embodiments of the invention have been described by way of illustration, it is understood that the invention may be carried out in many other ways by persons skilled in the art, without departing from its spirit or from the scope of the claims.

We claim:

1. Microcircuit means for the implementation of RSA encryption and decryption of an L-bit long message M in a modulo N encryption system having an encryption key E, comprising:

a plurality of cell units, wherein each cell unit comprises at least one 1-bit cell and wherein each 1-bit cell comprises:

a cyclic right shifting register for storing and shifting a bit of the message M;

a first register for storing a bit of inverted modular number N;

a left shifting register for storing a bit of a multiplicand B, wherein the left shifting register comprises input means for selectively providing a bit from a group of values comprising 2B and 2B−N;

a multiplication register for storing a bit of a multiplication value corresponding to a modulo N multiplication of the message M by the multiplicand; and an addition register for storing a bit of an addition value S, wherein the addition register comprises input means for selectively providing a bit from a group of values comprising S+B and S−N; and adder means, connected to said plurality of 1-bit cell units, for calculating 2B−N, S+B and S−N.

2. The microcircuit means according to claim 1 wherein the microcircuit further comprises a cyclic left shifting register for storing and shifting the encryption key E.

3. The microcircuit means according to claim 2 wherein each 1-bit cell further comprises a second register for storing and shifting a bit of the encryption key E.

4. Microcircuit means according to claim 1, wherein each cell further comprises communication means for performing, within a particular cell, all communication between registers of the particular cell.

5. Microcircuit means according to claim 1, wherein a first cell unit of said plurality of cell units is connected to both a second unit containing a next lower order bit of M, N, the multiplicand, the multiplication value and the addition value and a third unit containing a next higher order bit of M, N, the multiplicand, the multiplication value and the addition value.

6. Microcircuit means according to claim 1, wherein each cell unit comprises $4^m$ 1-bit cells, wherein m is an integer from zero to 4.

7. Microcircuit means according to claim 1, wherein the adder means comprise at least one adder.

8. Microcircuit means according to claim 1, wherein the adder means comprise CLA adders.

9. A circuit for use in a system for calculating the modulo N exponentiation of a number M, the system comprising a cyclic right shifting register M for storing and shifting M, a right shifting register for storing and shifting C, a left shifting register B for storing the multiplicand, a right shifting register S for accumulating modulo N products of two and B and a right shifting register N for storing −N, the circuit comprising:

a first register for storing and shifting a bit of M;

a second register for storing and shifting a bit of C;

a third register for storing a bit of the multiplicand B, wherein the third register has input means for receiving a value corresponding to a modulo N multiplication of said multiplicand by a power of two;

a fourth register for storing a bit of −N; and a fifth register for storing a bit from an intermediate value S of the modulo N multiplication, wherein the fifth register comprises input means for selectively providing a bit from a group of values comprising S+B and S−N.

10. The circuit of claim 9 wherein the circuit further comprises adding means for adding the bits from the third and fifth registers and the bits from the fourth and fifth registers in order to generate a new intermediate value of the modulo N multiplication, wherein the adding means comprises carry lookahead means for modifying the additions in response to carry bits received from a lower order circuit.

11. The circuit of claim 9 wherein the circuit further comprises adding means, connected to the input means of the third register, for computing the value corresponding to the modulo N multiplication of the multiplicand by a power of two, wherein the adding means comprises carry lookahead means for modifying the addition in response to carry bits received from a lower order circuit.

12. The circuit of claim 9 wherein the circuit further comprises a sixth register for storing and shifting a bit of an encryption-decryption key E.

13. Apparatus for calculating the product of the modulo N multiplication of a first number by a second number, comprising:

a cyclic right shifting register M for storing and shifting the first number;

a right shifting register C for storing the product;

a right shifting register S for storing intermediate values of the accumulation of powers of the second integer;

a left shifting register B for storing the multiplicand; and a right shifting register N for storing a number corresponding to −N, wherein the apparatus is implemented as a plurality of circuits, each circuit comprising:

a first storage means for storing and shifting a bit of the first number;

a second storage means for storing and shifting a bit of the second number;

a third storage means for storing a bit of intermediate values of a multiplicand B corresponding to the second number, wherein the third register has input means for receiving a sum corresponding to a modulo N multiplication of the multiplicand B by a power of two;

a fourth storage means for storing a bit of a value corresponding to −N; and a fifth storage means for storing a bit from an intermediate value S of the modulo N multiplication, wherein the fifth storage means comprises input means for selectively providing a bit from a group of values comprising S+B and S−N.

14. The apparatus of claim 13 wherein the circuit further comprises adding means for adding the bits from the third and fifth storage means and the bits from the fourth and fifth storage means in order to generate a new intermediate value of the modulo N multiplication, wherein the adding means comprises carry lookahead means for modifying the additions in response to carry bits received from a lower order circuit.

15. The apparatus of claim 13 wherein the circuit further comprises adding means, connected to the input means of the third storage means, for computing a sum corresponding to a modulo N multiplication of said multiplicand by a power of two, wherein the adding means comprises carry lookahead means for modifying the addition in response to carry bits received from a lower order circuit.

16. The apparatus of claim 13 wherein the apparatus further comprises a sixth register for storing and shifting a bit of an encryption/decryption key E and wherein the circuit further comprises sixth storage means for storing and shifting a bit of the encryption/decryption key E.

* * * * *

UNITED STATES PATENT AND TRADEMARK OFFICE
CERTIFICATE OF CORRECTION

PATENT NO. : 5,261,001

DATED : November 9, 1993

INVENTOR(S) : Eran J. Dariel and Carmi D. Gressel

It is certified that error appears in the above-identified patent and that said Letters Patent is hereby corrected as shown below:

Column 4, line 57, after "—" and insert ---N--.

Column 6, line 60, delete "$\leqq$" and insert --$\leq$--.

Column 7, line 5, delete "$\leqq$" and insert --$\leq$--.

Column 9, line 46, delete "$C_{out}N$" and insert --$C_{out}.N$--.

Column 9, line 49, delete "—N" and insert --.N--.

Signed and Sealed this

Twenty-eighth Day of June, 1994

Attest:

BRUCE LEHMAN

Attesting Officer     Commissioner of Patents and Trademarks